T. F. SMITH.
Grinding Mill.
No. 59,674.
Patented Nov. 13, 1866.
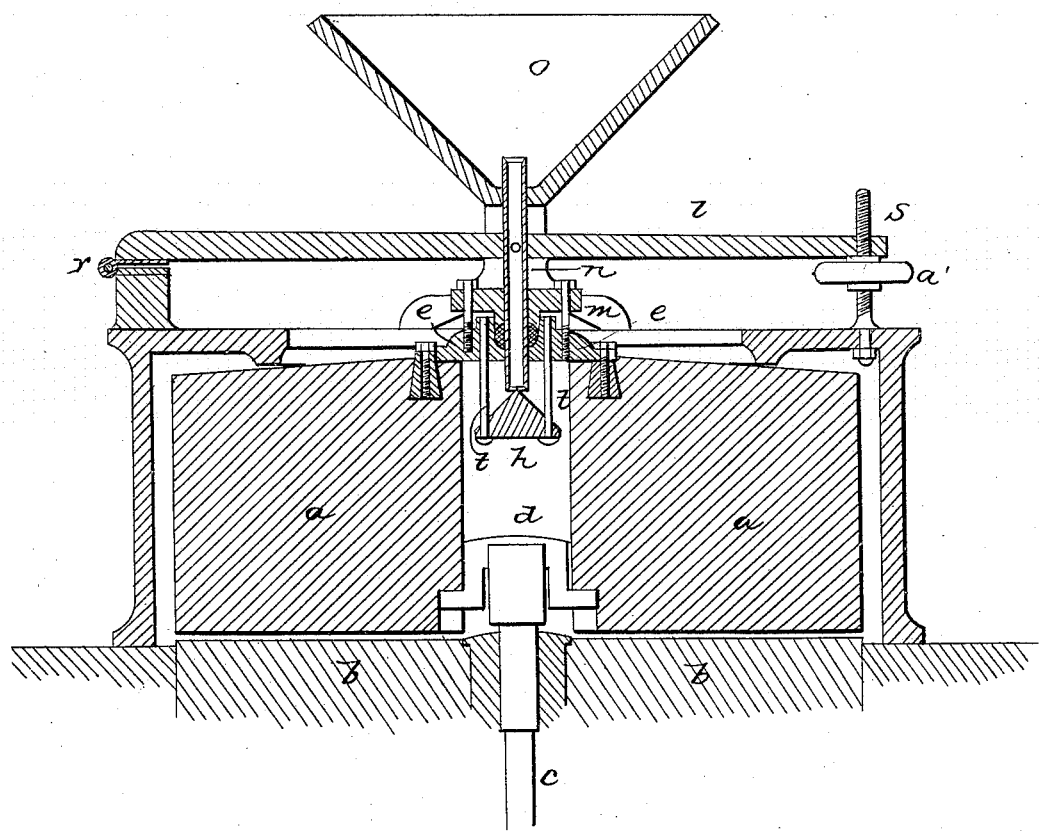

UNITED STATES PATENT OFFICE.

THOMAS F. SMITH, OF ELM GROVE, WEST VIRGINIA.

IMPROVEMENT IN GRINDING-MILLS.

Specification forming part of Letters Patent No. 59,674, dated November 13, 1866.

*To all whom it may concern:*

Be it known that I, THOMAS F. SMITH, of Elm Grove, in the county of Ohio and State of West Virginia, have invented a new and useful Improvement in Grinding-Mills; and I do hereby declare that the following is a full, clear, and exact description thereof, reference being had to the annexed drawing, making a part of this specification, in which—

Figure 1 is a vertical section through the grinding-stones and hopper.

The nature of my invention consists in providing the eye of the upper stone of a grinding-mill with an air-obstructor, by means of which, in conjunction with a tube for feeding the grain made air-tight in its connection with the air-obstructor, a vacuum or partial vacuum is obtained between the millstones, the air between the stones being thrown out by the centrifugal force of the upper stone in its revolution about its axis, thereby allowing the stones to be brought nearer together, and also preventing the heating of the flour.

To enable others skilled in the art to make and use my invention, I will proceed to describe its construction and operation.

$a$ is the upper millstone, which has its bearing at $d$, and which receives a rotary motion by power being applied in any convenient manner to the shaft $c$. $b$ is the lower millstone, which is stationary during the grinding operation. $e$ is an air-obstructor, placed over the eye of the upper stone, securely attached thereto, and made air-tight with regard to said eye. $n$ is a tube for feeding the grain from the hopper $o$, and passes through a stuffing-box, $m$, in the air-obstructor, its connection with the air-obstructor being made air-tight. $l$ is a lever hinged at $r$, which can be raised or lowered by means of the nut $a'$ and screw $s$, thereby elevating or depressing the tube $n$, which regulates the feed, in connection with the plate $h$, attached by stirrup-pieces or uprights $t\ t$, in the ordinary manner. $o$ is the hopper, and in the operation of the mill it is designed that the grain to be ground should cover the top of the tube $n$, in order to prevent the passage of air down said tube.

The operation is as follows: The upper stone being put in motion by power applied to its shaft $c$, and the hopper $o$ being filled with grain, the tube $n$ will allow very little, if any, air to pass down with the grain, while the air-obstructor will prevent air from entering by the eye of the stone.

The centrifugal force of the upper millstone in its rapid revolution about its axis will throw out the air from between the stones, thereby causing a vacuum or partial vacuum between the stones, and allowing them to be brought nearer together, and preventing the heating of the flour.

Having thus fully described my invention, what I claim as new, and desire to secure by Letters Patent, is—

The employment of an air-obstructor, substantially as described, in connection with the tube $n$, hopper $o$, and revolving upper millstone $a$, by means of which a vacuum or partial vacuum is obtained between the upper and lower millstones, in the manner and for the purposes described.

THOMAS F. SMITH.

Witnesses:
JAMES C. VENNUM,
JOHN F. SMITH.